May 31, 1927.
O. P. SMITH
1,630,811
STARTING CAGE FOR DOG RACING AND THE LIKE
Filed Dec. 8, 1925
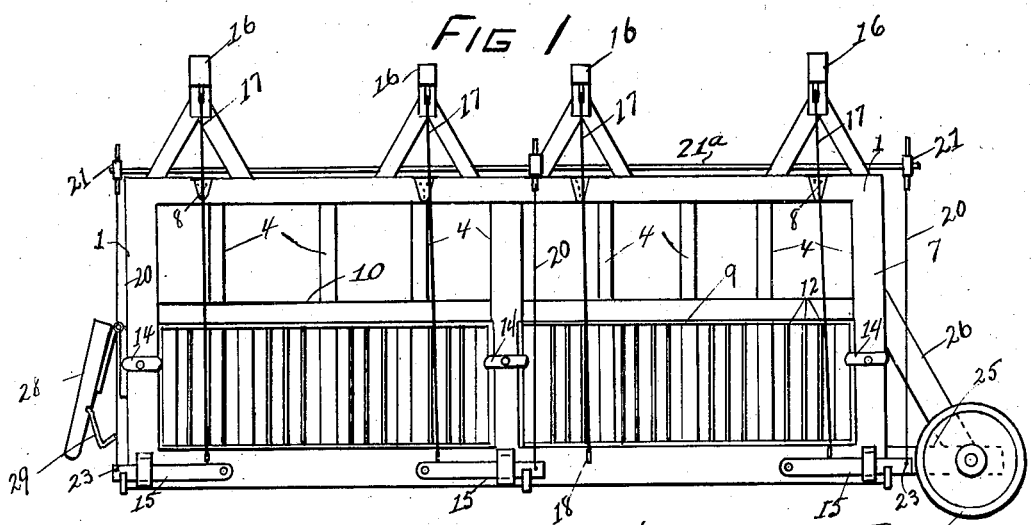
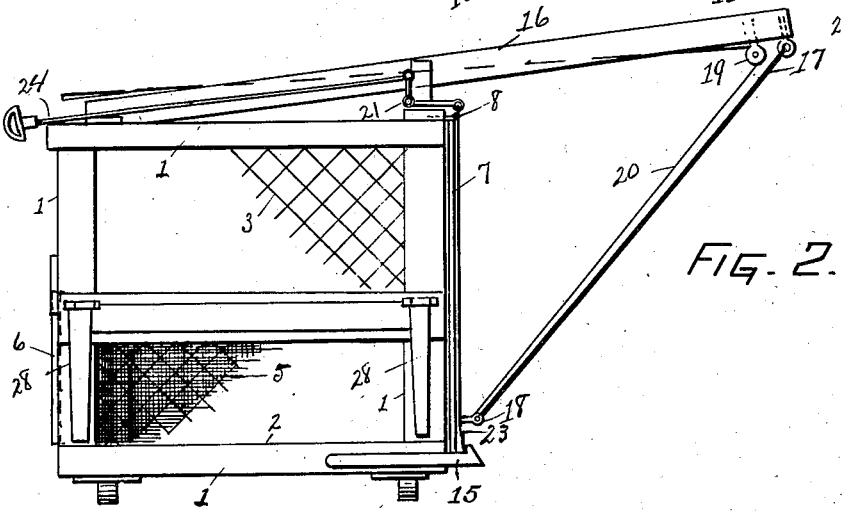
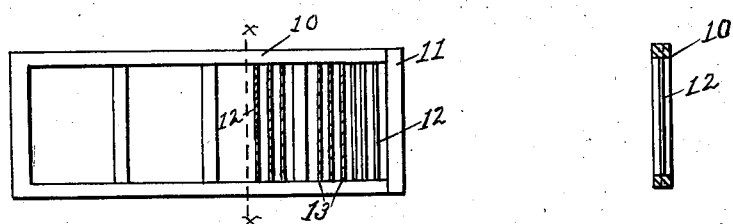
Owen P. Smith
By Chester W. Brown
his Attorney Patented May 31, 1927.

1,630,811

UNITED STATES PATENT OFFICE.

OWEN P. SMITH, OF MIAMI, FLORIDA.

STARTING CAGE FOR DOG RACING AND THE LIKE.

Application filed December 8, 1925. Serial No. 74,086.

My invention relates to cages for holding the dogs prior to releasing them in the races, and means for releasing all the dogs within said cage at once, that each may have an equal opportunity for winning the race.

It is customary to have five, six, seven or even eight dogs in a single race, and my cage is designed to provide a separate compartment for each dog, and at the same time open all of the stalls at once whenever the starting time arrives.

Another object is to provide a starting cage which may be readily removed from the track, and replaced thereon, as it is used.
Another object is to provide interchangeable doors for the front or releasing side of said cage, which shall be light in weight, with means for the dogs to see through it, and protected so that the dogs may not injure themselves against such doors while they are confined in said cage prior to the race, or when released in said race.

With the above and other objects in view, which will more particularly appear from the following description, my invention consists of the arrangement and combination of parts as hereinafter described and claimed, and while the invention is not restricted to the exact form of construction disclosed herein, yet for the purposes of illustrating a particular embodiment thereof, I have shown and described herein my preferred style of said invention, reference being had to the accompanying drawings, in which like numerals designate the same parts in the several views, and in which, Figure 1 is a front elevation of one of the starting cages.

Figure 2 is an end view of one of the said cages.

Figure 3 is a detail view of one of the interchangeable doors removed from said cage.

Figure 4 is a section view of the door shown in Figure 3 taken along the line x—x.
In constructing my said starting cage, I have preferably constructed a frame of suitable pieces of wood, as 1, 1, 1, 1, with a floor 2 on the bottom, preferably covered by rubber mats and the sides and partitions covered by one inch mesh poultry netting, as at 3. The cage is divided by means of partitions 4 into the required number of stalls, as eight shown herein. Said partitions may also be covered by poultry netting as used on the outside of the cage, or any other suitable material adapted to separate the dogs, and not permit them to fight or injure one another. I have preferably covered the lower portion of the poultry wire in each stall by means of fabric, as canvas 5, or other suitable material to prevent the dogs from injuring themselves on said poultry netting. In the rear of each stall I have provided a separate door for each stall, as 6, which slides up and down in suitable guides. This door is provided to permit admission of the dogs into their separate stalls.

The front of said cage is covered by the hinged door 7, attached at the top by means of the hinges 8, 8, and having the upper portion covered by poultry netting 3, as the remainder of said cage or other suitable material, and the lower portion covered by two interchangeable sections, as 9 and 10. These sections of the front door are made with frames, as 11, and attached vertically in these frames, are rods 12, 12, about one-fourth inch in diameter, and placed about one and one-half inches apart from center to center. These rods I have preferably covered by rubber tubing 13, to prevent any injury to the dogs placed within said cage. These sections 9 and 10, after being placed in the position shown in said door 7, are held in position by means of suitable buttons as 14.

At the lower edge of the door 7, I have shown a latch, as 15 which holds the door in position until released as hereinafter described. At the top of the cage I have provided forwardly projecting arms as 16, 16, and to the forward ends of these arms are attached the rubber cord, spring or other elastic material 17, 17, the other end of each such spring or elastic cord being attached to the bottom part of the door 7 as at 18. Passing through a pulley 19 at the outer end of the arm is a "stay rope" 20, one end of which is attached to the bell crank lever 21, and the other end to the latch 23. This rope passes through the latch at 23, and whenever the bell crank lever is operated by the hand cord 24, the latch is released at 15, and the spring 17 raises the door upward and forward very quickly and out of the way of the dogs, thus opening all stalls at one and the same time, and giving each dog an equal chance with the others to get started in the race. The bell crank levers 21 are mounted on a transverse rod or shaft 21ª as clearly illustrated in Fig. 1 of the drawing. This shaft or rod constitutes a rock shaft and all the bell crank levers move in unison when the rod or shaft is partially rotated by the hand cord 24. The bell crank levers have forwardly extending horizontal arms and upwardly extending vertical arms and the hand cord is connected to the vertical arm of one of the bell crank levers. The horizontal arms of the bell crank levers project forwardly and are connected by the ropes 20 with the latches. A stay rope which extends through the pulley 19 and which is connected at one end to a bell crank lever and at the other end to the lower portion of the door is adapted to be operated simultaneously with the latches so that in opening the door the rope 20 will be pulled upon thereby affording a positive opening movement and enabling the springs to act instantly upon the unlatching of the door.

At one end of the said cage I have provided the extension of the base as at 25, with an angle brace as 26. Mounted in the end of this brace 25 I have provided the truck wheels 27 and 27, for the purpose of supplying truck wheels upon which to move said cage on and off the track. At the other end of the cage I have provided the handles 28, 28, which are preferably hinged to the side as shown, and attached by the cords 29, 29, in such manner, that when the handles are raised to the horizontal position, the cords are drawn taut. These handles are provided to facilitate raising the end of the cage, in order that it may be wheeled about upon the truck wheels at the opposite end of said cage.

Having thus described my said invention, what I claim and desire to secure by Letters Patent, is the following:

1. A starting cage for racing dogs and the like, comprising a box like structure divided into a plurality of separate compartments, a door hinged at the top to the box and extending across the front of the same to close the compartments, a plurality of arms carried by the box and extending forwardly at the front of the same, resilient means connected with the arms and with the lower end of the door for automatically opening the same, a latch located at the bottom of the door for holding the latter in its closed position, a bell crank lever mounted upon the box above the door and having an approximately horizontal arm connected with the latch, said bell crank lever being also provided with a substantially vertical arm, an operating device connected with the vertical arm of the bell crank lever, a guide located at the outer end of a projecting arm, and a stay rope passing through the guide and connected with the door at the bottom thereof and extending from the guide to the bell crank lever and connected therewith whereby when the bell crank lever is actuated to unlatch the door, the stay rope will be simultaneously pulled to assist the opening of the door.

2. A starting cage for racing dogs and the like, comprising a box like structure divided into a plurality of separate compartments, a door hinged at the top to the box and extending across the front of the same to close the compartments, arms projecting forwardly from the box at the top of the door, a plurality of resilient devices connected with the outer ends of the arms and with the bottom of the door for automatically opening the same, a plurality of latches arranged at the bottom of the door for securing the same in its closed position, a shaft mounted upon the box above the door and extending longitudinally of the same and provided with angularly related arms arranged substantially horizontal and vertically, the horizontal arms being connected with the latches and operating a cord connected with a vertical arm of the shaft, a pulley mounted on a projecting arm of the box at the outer end of the same, and a stay rope passing over the pulley and connected at one end of the bottom of the door and at the other end to a vertical arm of the shaft and adapted to be pulled to impart an opening movement to the door when the latter is unlatched.

In testimony whereof I have duly signed the foregoing specification.

OWEN P. SMITH.